(12) United States Patent
Alex et al.

(10) Patent No.: US 8,116,021 B2
(45) Date of Patent: Feb. 14, 2012

(54) SYNCHRONIZED REWRITING OF DATA

(75) Inventors: Michael Alex, Fremont, CA (US);
Xiaodong Che, Saratoga, CA (US);
Zhen Jin, Fremont, CA (US); Michael Paul Salo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 85 days.

(21) Appl. No.: 12/629,437

(22) Filed: Dec. 2, 2009

(65) Prior Publication Data

US 2011/0128646 A1 Jun. 2, 2011

(51) Int. Cl.
*G11B 27/36* (2006.01)

(52) U.S. Cl. ................ 360/31; 360/51; 360/75

(58) Field of Classification Search .......... None
See application file for complete search history.

(56) References Cited

U.S. PATENT DOCUMENTS

| | | | |
|---|---|---|---|
| 5,721,816 A * | 2/1998 | Kusbel et al. ............... 714/15 |
| 6,490,111 B1 * | 12/2002 | Sacks ............... 360/53 |
| 6,947,234 B2 * | 9/2005 | Lamberts et al. ............... 360/53 |
| 7,155,015 B2 | 12/2006 | Katayama et al. |
| 7,196,860 B2 * | 3/2007 | Alex ............... 360/31 |
| 7,265,921 B2 | 9/2007 | Dunn et al. |
| 7,697,226 B2 * | 4/2010 | Abe et al. ............... 360/53 |
| 2008/0239548 A1 | 10/2008 | Paul et al. |
| 2008/0239901 A1 | 10/2008 | Tsunokawa et al. |
| 2008/0259488 A1 | 10/2008 | Kang et al. |
| 2008/0310268 A1 | 12/2008 | Chuang |

OTHER PUBLICATIONS

Novell, et al., "Improving Disk Writes", http://www.novell.com/documentation/nw51/index.html?page=/documentation/nw51/sdiskenu/data/h40blv3m.html, (Apr. 14, 2008),1-2.
Pancescu, Alexandru "750GB Hard Drives from Western Digital", *Hardware Editor*, (Jul. 18, 2007),1-2.
Yamada, et al., "Servo Track Writing Technology", *Fujitsu Sci. Tech.*, (Jan. 2006),93-102.
Sun, et al., "Solaris UFS and Disk IO Performance for Large Synchronous Sequential Writes", http://developers.sun.com/solaris/articles/solUFSdiskIO.html, (Apr. 14, 2008), 1-3.

* cited by examiner

*Primary Examiner* — Jason Olson

(57) ABSTRACT

A hard disk drive (HDD) including a magnetic disk, the magnetic disk including a data track. The HDD also includes a synchronized rewrite controller for synchronizing a plurality of rewrites of a data pattern on a location of the track of the magnetic disk and the HDD includes a write head controlled by the synchronized rewrite controller for writing the data pattern on the location of the data track and rewriting the data pattern a plurality of times on the location in synchronization with a prior writing of the data pattern on the data track.

16 Claims, 4 Drawing Sheets

300

```
┌─────────────────────────────────┐
│  Write a data pattern on a      │
│  location on a data track of    │
│  the magnetic disk with a       │
│  write head                     │
│  310                            │
└─────────────────────────────────┘
              │
              ▼
┌─────────────────────────────────┐
│  Rewrite the data pattern a     │
│  plurality of times on the      │
│  location on the data track of  │
│  the magnetic disk with the     │
│  write head. The rewritten      │
│  data pattern is synchronized   │
│  with a prior writing of the    │
│  data pattern                   │
│  320                            │
└─────────────────────────────────┘
              │
              ▼
┌─────────────────────────────────┐
│  Increase a signal-to-noise     │
│  ratio (SNR) based on the       │
│  writing by at least 0.2        │
│  decibels (dB) based on the     │
│  rewriting of the data pattern  │
│  330                            │
└─────────────────────────────────┘
```

FIG. 3

400 write a data pattern on a location of the data storage medium with a write head
410

Rewrite the data pattern consecutively on the same location of the data storage medium with the write head. The rewritten data pattern is synchronized and in-phase with a prior writing of the data pattern.
420

SYNCHRONIZED REWRITING OF DATA

FIELD

Embodiments of the present technology relate generally to the field of information storage systems.

BACKGROUND

High writing quality of data onto a disk(s) in the disk drive is an important metric to gauge performance of a disk drive. Writing quality is often hard to gauge because, in part, magnetic transition sharpness (transition shape in general) and saturation level on and off-track both affect the writing quality. Typically, writing quality is improved by improving magnetic write head design and/or improved media. However, improved writing quality may occur from existing hard drive components. Moreover, by improving the writing quality, the drive performance and the drive reliability of the hard disk system may also improve.

BRIEF DESCRIPTION OF THE DRAWINGS

FIG. 3, illustrates an example of a flow chart of a method for synchronously rewriting data on a magnetic disk in a hard disk drive, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Information storage systems are designed and manufactured under tight controls and specifications. If a storage system(s) does not meet the specifications, then the system is rejected and not able to be sold and/or not accepted by customers which results in a low yield. For example, the disk may not be perfectly round or at least, meet the specifications in regards to the roundness. Accordingly, the disk may have underperforming section(s), such as but not limited to locations on data tracks. The underperforming section(s) may only represent a small portion of the desk (e.g., approximately 5%) and the remaining portion of the disk may meet and exceed the specifications. However, the disk is still rejected because of the underperforming portion(s).

The writing quality on the disk at the underperforming sections of the disk may be improved, such that the disk meets the specifications (e.g., a certain signal-to-noise (SNR) ratio) and therefore not rejected. As described herein, synchronized multiple rewrites of data on to the same location on a disk increases drive performance and yield.

Figure 1:
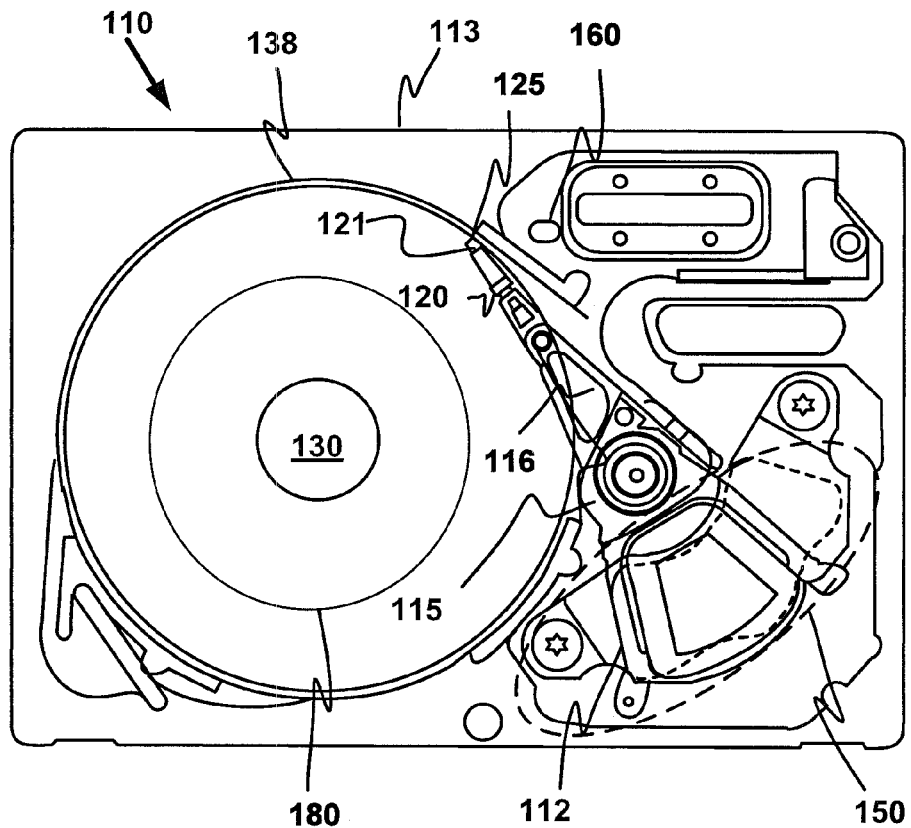
FIG. 1 illustrates an example of a HDD, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer sealed housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 115 includes one or more actuator arms 116. When a number of actuator arms 116 are present, they are usually represented in the form of a comb that is movably or pivotally mounted to base/housing 113. Actuator assembly 115 may be coupled with a connector assembly, such as a flex cable to convey data between arm electronics and a host system, such as a computer, wherein HDD 110 resides.

A controller 150 is also mounted to base 113 for selectively moving the actuator arms 116 relative to the disk 138. In one embodiment, controller 150 also functions as a synchronized rewrite controller for synchronizing multiple rewrites of data on magnetic disk 138. It should be appreciated that a synchronized rewrite controller can be separate from controller 150 and located in various locations within the HDD.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, read head and a write head 125 are called the Head Gimbal Assembly (HGA).

The ILS 120 has a spring-like quality, which biases or presses the air-bearing surface (ABS) of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the HGA to move along radial arcs on the surface of disk 138. In one embodiment, the controller causes the HGA to move along one of a plurality of data tracks on the surface of the disk 138. The data track 180 is a location on the disk 130 where data is read by the read head or written by the write head 125.

Figure 2:
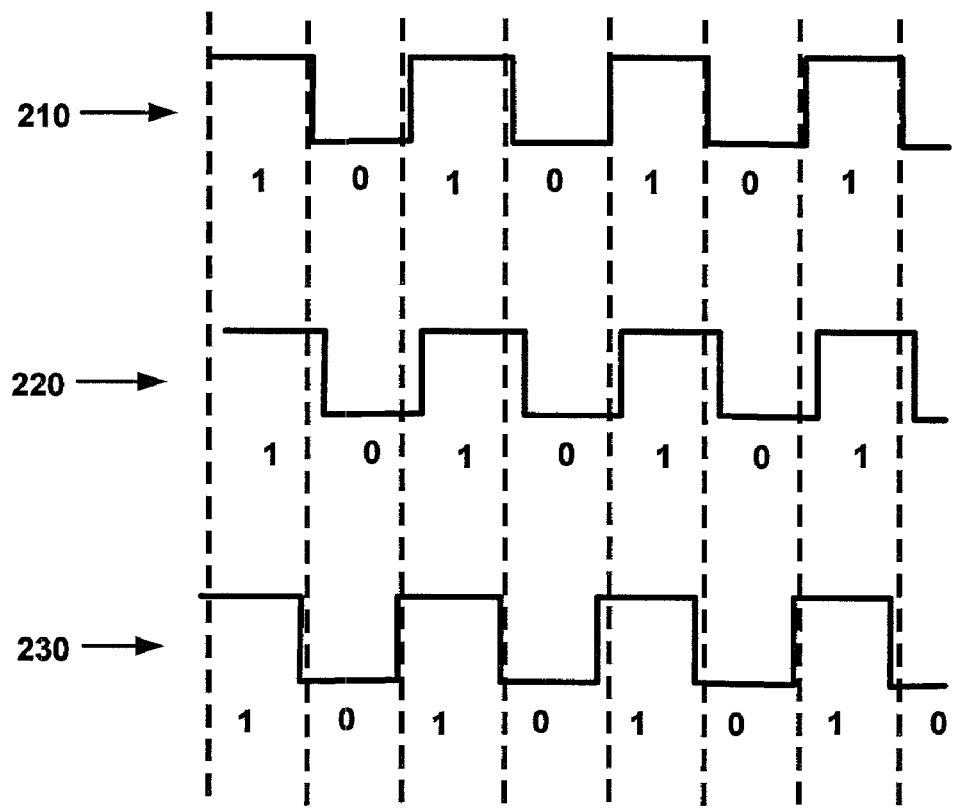
FIG. 2 illustrates an example of synchronized write current waveforms, in accordance with an embodiment of the present invention.

To improve the writing quality in HDD 110, write head 125 writes a data pattern onto a location of disk 138 as usual. It should be appreciated that write head 125 writes the data pattern onto disk 138 in any method(s) that is/are standard in writing technology. An example of a current waveform of a data pattern is depicted in FIG. 2, described later. The write head 125 then synchronously rewrites the same exact data pattern onto the same exact location of disk 138 as the first writing of the data pattern. It should be appreciated that the same exact location can be substantially the same location because of a small acceptable writing jitter.

In various embodiments, the write head 125 synchronously rewrites the data pattern from one time to theoretically infinity. In one embodiment, the write head 125 writes a data pattern to a location of the disk, with a SNR of approximately 40 db. In another embodiment, the write head 125 synchronously rewrites the data pattern at the same location two times. In yet another embodiment, there is a gain of approximately 0.2 decibels (dB) in the SNR because of the synchronized rewriting of the data pattern.

The write head 125 can write a data pattern on any location of the disk 138 and synchronously rewrite the same exact data on the same exact location of the disk 138. In one embodiment, the write head 125 writes a data pattern on a location of a data track 180. In another embodiment, the write head 125 writes a data pattern on an underperforming location of a data track 180 or cylinder. The underperformance can be related to the data track not meeting a variety of manufacturing requirements and/or specifications set up by industry standards and/or customer standards.

FIG. 2 illustrates synchronized write current waveforms 200 in accordance with an embodiment of the present invention. The first write of a data pattern onto a location of disk 138 by write head 125 is a current wave form 210. The second write or synchronized rewrite of a data pattern by write head at the same location on disk 138 is current waveform 220. The third write of another synchronized rewrite of a data pattern by the write at the same location on disk 138 is current waveform 230. The wave form depicted is a single-tone square waveform. It should be appreciated that the current waveform can be any current waveform compatible with the writing of a data pattern onto a disk.

The 1 on the x-axis of FIG. 2, is one polarity of a current (e.g., 30 milliamps (mA)). The 0 on the x-axis is another polarity. The waveform from one polarity to the other (e.g., 1 to 0) is a period of the wave form. FIG. 2 depicts a slight jitter between the write (e.g., 210) and the multiple rewrites (e.g., 220 and 230). The jitter is shown as a slight offset of the current waveforms 210-230. In one embodiment, the jitter is less than 200 picoseconds. In another embodiment, the jitter is approximately 100 picoseconds. It should be appreciated that there can be multiple rewrites of one to theoretically infinity.

FIG. 3 illustrates a flow chart of a method 300 for synchronously rewriting data on a magnetic disk in a hard disk drive, in accordance with an embodiment of the present invention. In one embodiment, method 300 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 300 is performed at least by system 100 of FIG. 1.

At step 310 of method 300, a data pattern is written on a location on a data track of the magnetic disk with a write head. At step 320, the same data pattern is rewritten a plurality of times on the same location on the data track of the magnetic disk with the write head. The rewritten data pattern is synchronized with a prior writing of the data pattern. In one embodiment, the rewriting is performed at least two times on the same exact location on a data track. In another embodiment, the rewriting is performed in-phase a plurality of times on the same exact location on a data track. In a further embodiment, the rewriting of the data pattern is performed a plurality of times with a writing jitter of less than 200 picoseconds. In yet another embodiment, the rewriting of the data pattern is performed a plurality of times with a writing jitter of approximately 100 picoseconds.

It should be appreciated that the data pattern can be written by the write head at any location on a disk. In one embodiment, the data pattern is synchronously rewritten a plurality of times on an underperforming location of the disk.

The synchronized rewriting of the data pattern is performed consecutively a plurality of times on the same location of a data track. In other words, the synchronized writing is performed without interruption of other reading and/or writing commands for writing other data at another location on a disk.

At step 330, a SNR based on the writing is increased by at least 0.2 decibels (dB) based on the rewriting of the data pattern. In one embodiment, a single write of the data pattern results in approximately 40 dB SNR. In another embodiment, a data pattern synchronously rewritten at the same location two times results. In yet another embodiment, there is a gain in the SNR of approximately 0.2 dB. It should be appreciated that the gain can any chosen threshold. It should also be appreciated that the gain can be any threshold base on a "maxed-out" number of sync-rewrites (e.g., 1000 times).

Figure 4:
FIG. 4, illustrates an example of a flow chart of a method for synchronously rewriting data on a data storage medium, in accordance with an embodiment of the present invention.

FIG. 4 illustrates a flow chart of a method 400 for synchronously rewriting data on a data storage medium, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In one embodiment, method 400 is performed at least by system 100 of FIG. 1.

At step 410 of method 400, a data pattern on a location of a data storage medium is written with a write head. In one embodiment, the data pattern is a single tone data pattern.

At step 420, the data pattern is consecutively rewritten at the same location of the data storage medium with the write head. The rewritten data pattern is synchronized and in-phase with a prior writing of the data pattern. In one embodiment, the data pattern is consecutively rewritten without interruption from reading a different data pattern. In another embodiment, the data pattern is consecutively rewritten without interruption from writing a different data pattern.

It should be appreciated that the data pattern can be written by the write head at any location on the storage medium. In one embodiment, the data pattern is synchronously rewritten a plurality of times on an underperforming location of the storage medium. In another embodiment, the underperforming location of the storage medium is an underperforming cylinder.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive (HDD) comprising:
    a magnetic disk, wherein said magnetic disk comprises a data track;
    a synchronized rewrite controller for synchronizing a plurality of rewrites of a first data pattern on a location of said track of said magnetic disk;
    a write head controlled by said synchronized rewrite controller for writing said first data pattern on said location of said data track and rewriting said data pattern consecutively a plurality of times on said location in synchronization and in-phase with a prior said writing of said first data pattern on said data track, wherein said rewriting said first data pattern consecutively occurs without interruption from at least one of reading a second data pattern and writing a third data pattern, wherein said second and third data pattern are different from said first data pattern.

2. The drive of claim 1 comprising:
    a writing jitter between said writing and said rewriting of said first data pattern, wherein said writing jitter is less than 200 picoseconds.

3. The drive of claim 2, wherein said writing jitter comprises:
    a writing jitter of on or about 100 picoseconds.

4. The drive of claim 1 comprising:
    a signal-to-noise ratio (SNR) based on one write of said first data pattern, wherein said SNR based on one write is increased by at least 0.2 dB based on said rewriting said first data pattern in synchronization with said prior said writing of said first data pattern on said data track.

5. The drive of claim 1, wherein said location on said data track comprises:
    an underperforming location on said data track, wherein said underperforming location falls below a threshold defined by industry standard specifications.

6. A method for synchronously rewriting data on a magnetic disk in a hard disk drive (HDD), said method comprising:
    writing a first data pattern on a location on a data track of said magnetic disk with a write head;
    rewriting said first data pattern a plurality of times on said location on said data track of said magnetic disk with said write head, wherein said rewritten first data pattern is synchronized and in-phase with a prior said writing of said first data pattern, wherein said rewriting said first data pattern consecutively occurs without interruption from at least one of reading a second data pattern and writing a third data pattern, wherein said second and third data pattern are different from said first data pattern.

7. The method of claim 6, wherein said rewriting said first data pattern a plurality of times comprises:
    rewriting said first data pattern at least two times on said location on said data track.

8. The method of claim 6, wherein said rewriting said first data pattern comprises:
    rewriting said first data pattern with a writing jitter less than 200 picoseconds said plurality of times on said location on said data track.

9. The method of claim 8, wherein said rewriting said first data pattern comprises:
    rewriting said first data pattern with said writing jitter on or about 100 picoseconds said plurality of times on said location on said data track.

10. The method of claim 6, wherein said rewriting said first data pattern comprises:
    rewriting said first data pattern consecutively said plurality of times on said location on said data track.

11. The method of claim 6, comprising:
    increasing a signal-to-noise ratio (SNR) based on said writing by at least 0.2 decibels (dB) based on said rewriting said first data pattern.

12. The method of claim 6, wherein said rewriting said first data pattern comprises:
    rewriting said first data pattern said plurality of times on an underperforming location on said data track, wherein said underperforming location falls below a threshold defined by industry standard specifications.

13. A method for synchronously rewriting data on a data storage medium, said method comprising:
    writing a first data pattern on a location of said data storage medium with a write head;
    rewriting said first data pattern consecutively on said same location of said data storage medium with said write head, wherein said rewritten first data pattern is synchronized and in-phase with a prior said writing of said first data pattern, wherein said rewriting said first data pattern consecutively occurs without interruption from at least one of reading a second data pattern and writing a third data pattern, wherein said second and third data pattern are different from said first data pattern.

14. The method of claim 13, wherein said writing said first data pattern comprises:
    writing a single-tone data pattern.

15. The method of claim 13, wherein said writing said first data pattern on a location of said data storage medium with a write head comprises:
    writing said first data pattern on an underperforming area of said data storage medium with said write head, wherein said underperforming area falls below a threshold defined by industry standard specifications.

16. The method of claim 15, wherein said writing said first data pattern on said underperforming area comprises:
    writing said first data pattern on an underperforming cylinder of said data storage medium with said write head.

* * * * *